US012759583B2

(12) United States Patent
Esna Ashari Esfahani et al.

(10) Patent No.: US 12,759,583 B2
(45) Date of Patent: Oct. 13, 2026

(54) SYSTEM AND METHOD OF GAMIFIED ACTIVE LEARNING FOR VEHICLE PERCEPTION SYSTEMS

(71) Applicant: GM Global Technology Operations LLC, Detroit, MI (US)

(72) Inventors: Alireza Esna Ashari Esfahani, San Bruno, CA (US); Brent Navin Roger Bacchus, Sterling Heights, MI (US); Upali P. Mudalige, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 333 days.

(21) Appl. No.: 18/469,597

(22) Filed: Sep. 19, 2023

(65) Prior Publication Data

US 2025/0091610 A1 Mar. 20, 2025

(51) Int. Cl.
*B60W 60/00* (2020.01)
*G06V 20/58* (2022.01)

(52) U.S. Cl.
CPC ......... *B60W 60/0015* (2020.02); *G06V 20/58* (2022.01); *B60W 2420/403* (2013.01); *B60W 2554/4049* (2020.02)

(58) Field of Classification Search
CPC ....... B60W 60/0015; B60W 2420/403; B60W 2554/4049; G06V 20/58
See application file for complete search history.

(56) References Cited

U.S. PATENT DOCUMENTS

| | | | | |
|---|---|---|---|---|
| 11,803,617 | B1 * | 10/2023 | Campbell | G06V 10/7784 |
| 2018/0232646 | A1 * | 8/2018 | Acharya | G06N 7/01 |
| 2019/0228262 | A1 * | 7/2019 | Gonzalez | A63F 13/65 |
| 2022/0092291 | A1 * | 3/2022 | Lai | G01S 17/42 |

OTHER PUBLICATIONS

Lorieul, T. "Uncertainty in predictions of Deep Learning models for fine-grained classification," Machine Learning, Universite Montpellier, 2020.

* cited by examiner

*Primary Examiner* — Toya Pettiegrew
(74) *Attorney, Agent, or Firm* — Vivacqua Crane, PLLC

(57) ABSTRACT

A system and method of gamified learning for a vehicle is provided. The system includes a perception model configured to receive perception data from a camera, execute a perception task to obtain a task result for the object, determine the perception confidence level of the task result is below a predetermined perception confidence threshold, show an image of the object to an on-scene user, request the on-scene user to annotate the object, and reward the on-scene user in response to receiving the annotation from the on-scene user. The system further includes a server configured to aggregate a plurality of annotations from a plurality of users, apply a probabilistic model to determine a ground truth annotation, and input the ground truth annotation and an image to a machine learning model to update the perception model.

18 Claims, 7 Drawing Sheets

SYSTEM AND METHOD OF GAMIFIED ACTIVE LEARNING FOR VEHICLE PERCEPTION SYSTEMS

INTRODUCTION

The present disclosure relates to perception systems of vehicles; and more particularly to active learning for the perception systems.

Advanced Driver Assistance Systems (ADAS) equipped vehicles and Automated Driving Systems (ADS) equipped vehicles employ vehicle perception systems to assist or eliminate the need for a human operator. The vehicle perception systems utilize a perception model based on a trained machined learning model to perform certain perception tasks such as object detection, object classification, instance segmentation, semantic segmentation, scene text recognition (STR), and the like.

The perception tasks may become more challenging during unfavorable weather conditions such as rain, snow, and fog, smog, as well as occlusions and improper positioning of objects may hinder the vehicle perception system in properly achieving the task result. For example, the vehicle detection systems may detect an object and properly classify the object as a traffic sign, but unable to further classify the type of traffic sign such as a stop sign, a yield sigh, a pedestrian-crossing sign, and the like, and/or unable to recognize the text on street signs such as the name of a street.

In such instances, perception data, such as image data, may be transmitted to a remote server and/or a back-office where a human annotator attempts to annotate the image data, such as identifying and documenting the class of an object or the name on a street sign by manual investigation of the image data. The newly annotated image data is used to fine-tune the training of the machined learning model for updates to the perception model.

Thus, while current methods of using remote servers and/or back-offices for further perception data annotations achieve its purpose, there is a continual need to improve the methods of perception data annotation for improved accuracy.

SUMMARY

According to several aspects, a method of gamified active learning for a perception system is provided. The method includes applying a perception model to execute a perception task on an object to obtain a perception task result, wherein the perception model is based on a machine learning model; determining a perception confidence level for the task result; determining the perception confidence level is below a predetermined perception confidence level; showing an image of the object to an on-scene user; requesting the on-scene user to annotate the object; providing an annotation of the object by the on-scene user, wherein the annotation is based on a visual observation of the object by the on-scene user; rewarding the on-scene user in response to the on-scene user providing the annotation of the object; and training the machine learning model with the image of the object and the annotation of the object by the on-scene user to update the perception model.

In an additional aspect of the present disclosure, the method further includes requesting the on-scene user to answer a predetermined question directed at the object. The predetermined question is selected from a group consisting of a freeform answer question, a multiple choice question, and a binary answer question.

In another aspect of the present disclosure, the method further includes determining a choice of annotation for the object does not exist on a server before requesting the on-scene user to annotate the object and selecting the freeform answer question in response to the choice of annotation does not exist on the server.

In another aspect of the present disclosure, the method further includes determining a choice of annotation for the object exists on a server before requesting the on-scene user to annotate the object; determining an annotation confidence level of the available choices for annotation for the object is less than a predetermined annotation confidence threshold; and selecting the multiple choice question in response to the choice of annotation for the object is less than the predetermined annotation confidence threshold.

In another aspect of the present disclosure, the method further includes determining the available choices for the annotation for the object exists on a server before requesting the on-scene user to annotate the object; determining an annotation confidence level for some choices of annotations for the object is equal to or greater a predetermined annotation confidence threshold; and selecting the binary choice question in response to the confidence level of some choices of annotation for the object is equal to or greater than the predetermined annotation confidence threshold.

In another aspect of the present disclosure, the method further includes providing annotations of a same object by a plurality of on-scene users; aggregating the annotations of the same object; applying a probabilistic model on the aggregated annotations to determine a ground truth annotation of the same object; and training the machine learning model with an image of the same object and the ground truth annotation of the same object.

In another aspect of the present disclosure, the annotations provided by the plurality of on-scene users are based on the binary question. The probabilistic model is a Dirichlet distribution. The same object is observed at different time periods and at different viewing perspectives.

In another aspect of the present disclosure, the further includes determining the on-scene user is credible before requesting the on-scene user to answer the question.

According to several aspects, a gamified active learning system for a vehicle is provided. The system includes a human-machine-interface (HMI) configured to display an image to an occupant of the vehicle; at least one external viewing camera; and a perception module. The perception module includes a perception model configured to receive perception data from the at least one external camera, analyze the received perception data to detect an object, execute a perception task to obtain a task result for the object, determine a perception confidence level of the task result, determine the perception confidence level of the task result is below a predetermined perception confidence threshold, send a signal to the HMI to show an image of the object to an on-scene user, request the on-scene user to annotate the object based on a visual inspection of the object by the on-scene user, receive an annotation from the on-scene user, and reward the on-scene user in response to receiving the annotation from the on-scene user. The HMI may be that of a personal electronic device.

In an additional aspect of the present disclosure, the system further includes a remote server configured to aggregate a plurality of annotations from a plurality of users; apply a probabilistic model on the aggregated annotations to determine a ground truth annotation of the same object; and input the ground truth annotation and an image of the object to a machine learning model to update the perception model.

In another aspect of the present disclosure, the perception task is to determine the detection, segmentation, and classification of the object and the task result is a predicted classification of the object.

In another aspect of the present disclosure, the object is a street sign, the perception task is the extraction of text from the street sign, and the task result is a prediction of a name on the street sign based on the extracted text.

According to several aspects, a perception module is provided. The perception module includes a processor and a non-transitory computer readable storage device. The storage device contains a perception model stored thereon for gamified active learning, that upon execution of the perception model by the processor, cause the processor to execute a perception task to obtain a task result for a detected object; determine a perception confidence level of the task result; determine the perception confidence level of the task result is below a predetermined perception confidence threshold; send a signal to a visual display to show an image of the object to an on-scene user in response to the perception confidence level of the task result is below the predetermined perception confidence threshold; request the on-scene user to answer a predetermined question regarding the object; and receive an answer from the on-scene user based on a visual observation of the object by the on-scene user.

In an additional aspect of the present disclosure, the execution of the perception model by the processor, further cause the processor to: determine one of: (i) a choice of annotation for the object exists on a server, and (ii) the choice of annotation for the object does not exist on a server; determine one of: (i) an annotation confidence level of the choice of annotation for the object is less than a predetermined annotation confidence threshold, and (ii) the annotation confidence level of the choice of annotation for the object is equal to or greater than the predetermined annotation confidence threshold. The predetermined question regarding the object is one of: (i) a freeform answer question in response to the choice of annotation for the object does not exist on the server; (ii) a multiple choice question in response to the choice of annotation for the object exists on the server and the annotation confidence level of the choice of annotation is less than the predetermined annotation confidence threshold; and (iii) a binary question in response to the choice of annotation for the object exists on the server and the annotation confidence level of the choice of annotation is equal to or greater than the predetermined annotation confidence threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term module, control module, or controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

Figure 1:
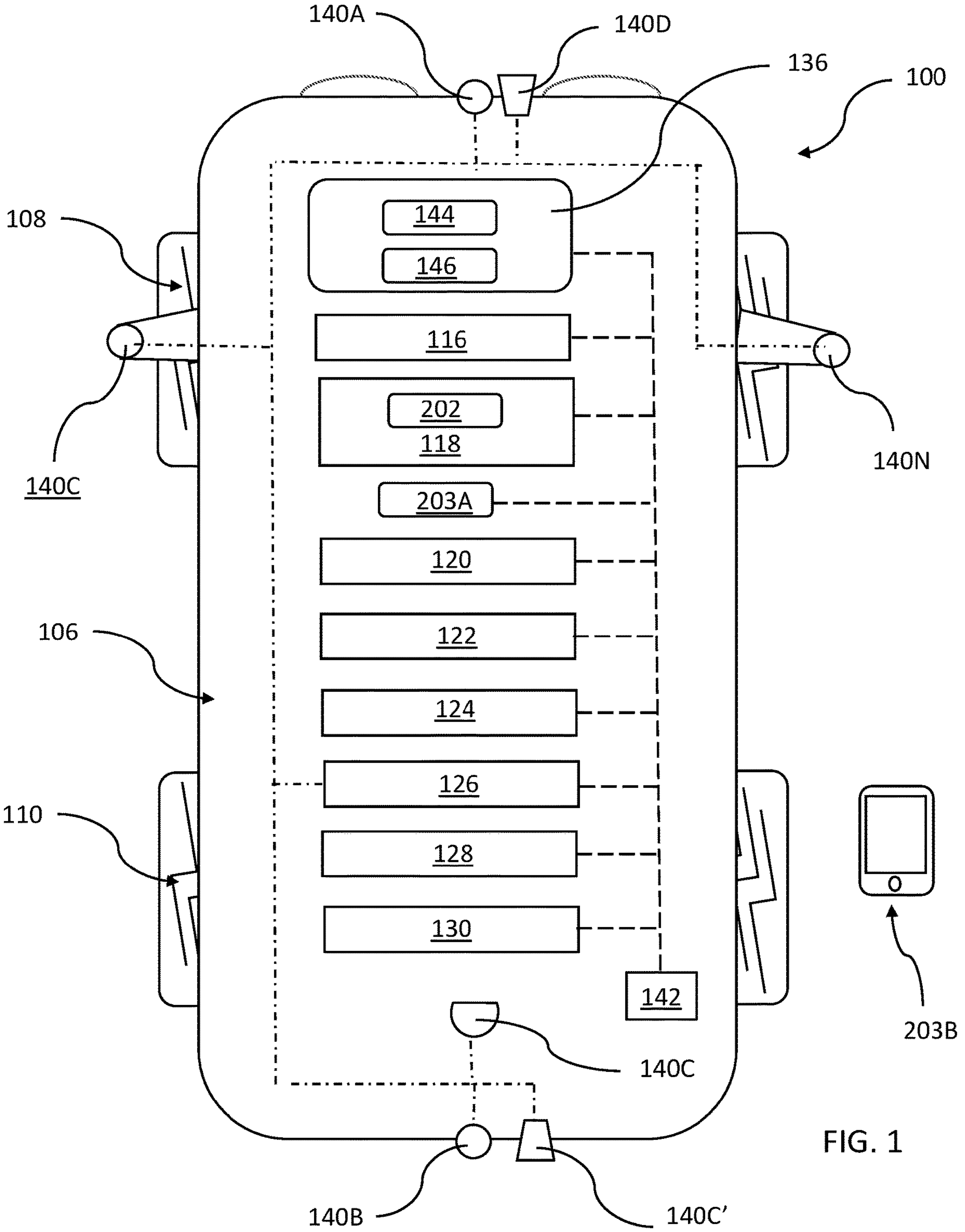
FIG. 1 is a functional diagram of vehicle equipped with a perception system, according to an exemplary embodiment.

FIG. 1 shows a functional block diagram representation of an vehicle 100 equipped with a perception system having a perception module 202 configured for gamified active learning. As a non-limiting example, the vehicle 100 shown is an autonomous vehicle having an Automated Driving System (ADS) capable of operating from Level 0 (no driving automation) to Level 5 (full driving automation) in accordance with SAE J3016 levels of driving automation. It should be appreciated that the vehicle 100 may also be that of an Advanced Driver Assistance System (ADAS) equipped vehicle requiring the input of a driver or operator.

The vehicle 100 generally includes a body 106, front wheels 108, and rear wheels 110. The body 106 substantially encloses components of the vehicle 100. The front wheels 108 and the rear wheels 110 are each rotationally coupled to the body 106 near a respective corner of the body 106. As shown, the vehicle 100 generally includes a vehicle sensor system 116, a perception system 118 having a perception module 202 configured for gamified active learning, a propulsion system 120, a transmission system 122, a steering system 124, a brake system 126, an actuator system 128, a vehicle communication system 130, and at least one vehicle controller 136. The perception module 202 is shown as part of the perception system on-board the vehicle 100. It should be appreciated that portions of the perception module 202 may be located remote from the vehicle 100, also referred to as off-board, and communicates with the vehicle perception system 118 and sensor system 116. The vehicle 100 further includes a Human-Machine-Interface (HMI) 203A, 203B. The HMI 203A, 203B may be an in-cabin display monitor 203A configured to display an image of a detected object to an occupant of the vehicle 100. For ADS equipped vehicles, the HMI 203A, 203B may also include that of a personal electronic device 203B having a viewing display such as that of a cell phone, tablet, and/or personal laptop computer. While the vehicle 100 is depicted in the illustrated embodiment as a passenger car, other examples of vehicles include, but are not limited to, motorcycles, trucks, sport utility vehicles (SUVs), recreational vehicles (RVs), marine vessels, and aircraft.

The vehicle sensor system 116 includes one or more vehicle external sensing devices 140A-140N, also referred to external sensors 140A-140N, configured to sense observable conditions of the exterior environment of the vehicle 100. Examples of vehicle external sensing devices 140A-140N include, but are not limited to, radars 140A, lidars 140B, cameras 140C, ultrasonic sensors 140D, and other external sensors 140N capable of gathering and/or receiving information on the external surroundings of the vehicle. The perception module 202 of the perception system 118 is configured to receive perception data from the vehicle sensor system 116, detect one or more objects in the perception data, predict a classification for each of the detected objects, and extract useful information from the images such as text messages on traffic signs using scene text recognition (STR) methods, semantic segmentation models, instance segmentation models, and the like. Classification means a label indicating the type or nature of the object among a predefined list of objects.

The perception module 202 operates on a perception algorithm, or also referred to as a perception model, pre-trained using a machine learning architecture. Non-limiting examples of such machine learning architectures include deep neural networks, convolutional deep neural networks, deep belief networks, and/or recurrent neural networks configured to learn and classify objects using a predetermined machine learning algorithm. Supervised learning, unsupervised learning, or semi-supervised learning may be used to train a machine learning model to recognize traffic signs, stoplights, pedestrians, and other objects commonly detected in the vehicle's operating environment.

Supervised learning is defined by its use of labeled data sets to train the machine learning model to detect and classify data or predict outcomes accurately. Machine learning includes a training phase and an inference phase. In the training phase, as input data is fed into the machine learning model, the machine learning model adjusts its weights until it has been fitted appropriately. In the inference phase, the trained machine learning model can make inferences based on real-time data to determine a classification, detection, prediction, or segmentation of an object. The perception model is based on the trained machine learning model to detect, classify, or make a prediction of an object. The training phase may be conducted on a server off-board the vehicle on a cloud server or in a remote location, also referred to as a back-office. The inference phase is implemented as part of the perception model on the perception system 118 on-board the vehicle.

The propulsion system 120 may, in various embodiments, include an internal combustion engine, an electric machine such as a traction motor, and/or a fuel cell propulsion system. The transmission system 122 is configured to transmit power from the propulsion system 120 to the front wheels 108 and the rear wheels 110 according to selectable speed ratios. According to various embodiments, the transmission system 122 may include a step-ratio automatic transmission, a continuously-variable transmission, or other appropriate transmission.

The brake system 126 is configured to provide braking torque to the front wheels 108 and the rear wheels 110. The brake system 126 may, in various embodiments, include friction brakes, brake by wire, a regenerative braking system such as an electric machine, and/or other appropriate braking systems. The steering system 124 influences the position of the front wheels 108 and the rear wheels 110. While depicted as including a steering wheel for illustrative purposes, in some embodiments contemplated within the scope of the present disclosure, the steering system 124 may not include a steering wheel.

The actuator system 128 includes one or more actuator devices 142 configured to control one or more vehicle features such as for example, but not limited to, the propulsion system 120, the transmission system 122, the steering system 124, and the brake system 126. The one or more actuator devices 142 may be configured to control one or more vehicle features located within the passenger compartment such as steering wheel positions, seating positions, infotainment settings, and cabin environment settings.

The vehicle communication system 130 is configured to wirelessly communicate information to and from other entities ("vehicle-to-everything (V2X)" communication). For example, the vehicle communication system 130 is configured to wireless communicate information to and from other vehicles ("vehicle-to-vehicle (V2V)" communication), to and from driving system infrastructure ("vehicle to infrastructure (V2I)" communication), remote systems, and/or personal devices. In an embodiment, the vehicle communication system 130 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The vehicle controller 136 includes at least one processor 144 and a computer readable storage device 146. The computer readable storage device 146 may also be referred to as a computer readable media 146. The computer-readable storage device 146 is capable of storing data, some of which represent instructions executable by the processor 144, including algorithms for operating the various vehicle systems. The processor 144 and storage device 146 may be part of the vehicle controller 136, separate from the vehicle controller 136, or part of an individual vehicle system. Although only one vehicle controller 136 is shown in FIG. 1, alternative embodiments of the vehicle 100 can include any number of controllers that communicate over any suitable communication medium or a combination of communication mediums and that cooperate to process the sensor signals, perform logic, calculations, methods, and/or algorithms, and generate control signals to automatically control features of the vehicle 100.

Figure 2:
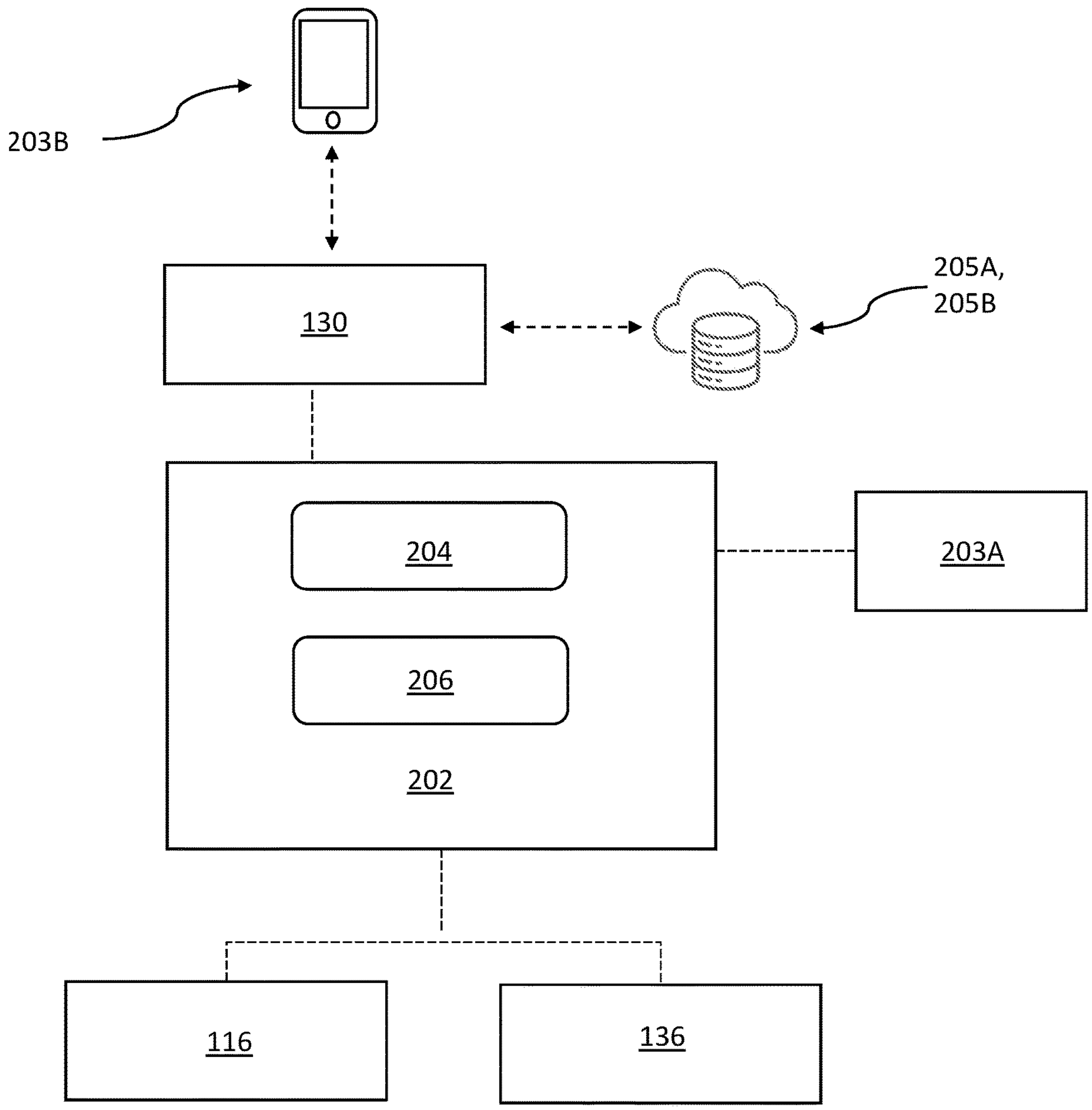
FIG. 2 is a functional diagram of the perception module of the perception system of the vehicle of FIG. 1, according to an exemplary embodiment.

FIG. 2 a functional diagram of a perception module 202, also referred to as module 202 for brevity. The module 202 is in communications with one or more of the vehicle sensor system 116, particularly with the cameras 140C, the vehicle communication system 130, the vehicle controller 136, and the in-cabin display monitor 203A. The module 202 is also in communication with the personal electronics device 203B and a cloud based server 205A and/or back office server 205B. The module 202 includes at least one system processor 204 and a system non-transitory computer readable storage device or media 206. The system processor 204 may be a custom made or commercially available processor, a central processing unit (CPU), a graphics processing unit (GPU), an auxiliary processor among several processors associated with the module 202, a semiconductor-based microprocessor (in the form of a microchip or chip set), a macro-processor, a combination thereof, or generally a device for executing instructions. The system computer readable storage device or media 206 may include volatile and nonvolatile storage in read-only memory (ROM), random-access memory (RAM), and keep-alive memory (KAM), for example. KAM is a persistent or non-volatile memory that may be used to store various operating variables while the system processor 204 is powered down. The system computer-readable storage device or media 206 of the module 202 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions.

The instructions may include one or more separate programs, each of which comprises an ordered listing of executable instructions for implementing logical functions. The instructions, when executed by the processor 204, receive and process signals from the external sensors 140A-140N, vehicle perception system 118, communication system 130, and/or vehicle controller 136 perform logic, calculations, methods and/or algorithms for a Method 400 of gamified active learning and to communicate to a cloud-server 205A and/or to a back-office 205B for furtherance of the gamified active learning.

The module 202 is configured to communicate over a suitable communication medium or a combination of communication mediums and that cooperate to process the sensor signals, perform logic, calculations, methods, and/or algorithms, and generate control signals to automatically control features of the perception system 118 and other vehicle systems. In various embodiments, one or more instructions of the module 202 are embodied in the non-transitory computer readable storage device. The system non-transitory computer readable storage device or media 206 and/or the vehicle non-transitory computer readable storage device or media 206 includes machine-readable instructions that when executed by the one or more system processors 204, cause the system processors 204 to execute the methods and processes described below.

In machine learning, data annotation is the process of labeling data to show the desired outcome of the machine learning model. The tasks of data annotation include marking, labeling, tagging, transcribing, or processing a dataset with the features wanted for the machine learning model to learn to recognize. In the annotation process, a new file is created that accompanies the image. The file specifies a bounding box for the detected objects, class of the object, text for a traffic sign, etc.

Figure 3:
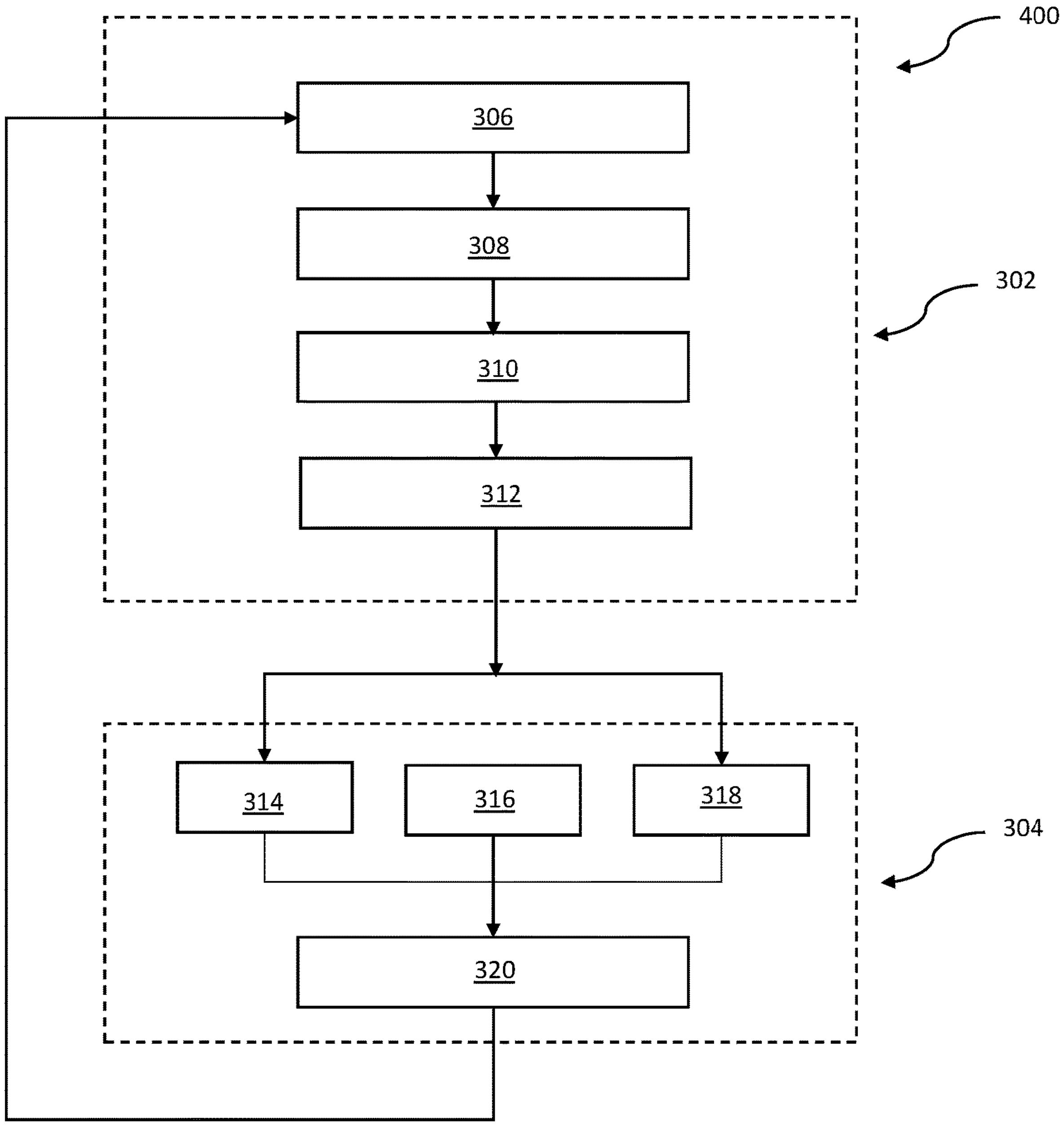
FIG. 3 is a high-level functional diagram of a method of gamified active learning, according to an exemplary embodiment.

FIG. 3 is a high-level functional diagram of a Method 400 of gamified active learning for collecting and processing of images that are a challenge for the perception system 118 to process. The Method 400 produces the annotations of an object in the image with the assistance of on-scene observers. Annotations of an object may include, but are not limited to, documenting, or noting, a classification of the object, a characterization of the object, text on a traffic sign, and other features regarding the object. The module 202 uses a software application, also referred to as an APP, in the form of a game to solicit freeform annotations from an occupant of a vehicle 100 or request the occupant to choose predetermined annotations in exchange for a reward. The reward may be a tangible reward in the form of a monetary reward, a voucher, goods, and other tangible items. The reward may also be an intangible reward such as game points and online subscription services such as music, movies, online games, and the like. Annotations may be solicited from occupants in the form of questions allowing for a freeform answer, a multiple choice answer, or a binary choice answer.

Occupants may choose to register and participate to earn the rewards. An occupant may include the driver or operator of the vehicle and any passengers within the vehicle. The occupant is also referred to as a customer and/or user. A vehicle containing a participating occupant is referred to as a participating vehicle. The dashed boundary box 302 contains steps that may be executed by the perception module 202 of the perception system 118. The dashed boundary box 304 contains steps that may be executed by an off-board server. Such an off-board server may include a cloud based server 205A or a server 205B located at a remote location, also referred to as a back-office 205B.

At Block 306, the perception module 202 receives perception data from the vehicle sensor system 116 and executes a perception task such as object detection, text extraction, object segmentation, etc. In a non-limiting example, the perception module 202 detects an object in an image and determines a classification of the object. At Block 308, the perception module 202 determines whether the probability or confidence level of the task result such as whether the classification of the object is below a predetermined perception confidence threshold.

At Block 310, the module 202 determines whether to ask an occupant of the participating vehicle or a back-office human to annotate the object. There are costs associated with annotating the object in both cases. However, the annotation cost rates might be different between the on-scene human user and offline human annotators. In some cases, on-scene annotation can be more accurate, such as being able to clearly view, or visually inspect, the name or text on a street sign. Privacy concerns for in-vehicle annotation are less than offline annotations as the occupant annotates the data, there is no need for sharing images that may include private data with offline human annotators.

At Block 312, if the module 202 determines to ask the on-scene human user, the gamified active learning application (APP) is activated. The module 202 determines whether to ask a question having a freeform answer (also referred to as a freeform answer question or a freeform response question), a question having multiple choice answers (also referred to as a multiple choice question), or a question having binary choice answers (also referred to as a binary choice question) based on the credibility of the human user, type of vehicle, and/or situations such as whether or not annotation choices exist that were completed by other participating vehicles or off-line human annotators. The questions to the on-scene human users may be directed to the possible classifications and/or characteristics of the object. The answers to the questions are considered annotations on the object. The final annotation, also referred to as a ground truth label, is determined by processing a predetermined number of answers from a predetermined number of participants in the game according to the Method 400.

At Block 314, the off-board server 205A, 205B communicates with the module 202 and aggregates the annotations from a plurality of on-scene users on the same object. The same object may be observed or inspected at different time periods and at different viewing perspectives. Telemetry data such as GPS information, and map data, together with computer vision methods that can verify the same object is appearing in different images, may be used to confirm that the same object is being annotated by the plurality of on-scene users.

At Block 316, a crowd sourced annotation is generated by aggregating annotations from a plurality of on-scene users from Block 314 with annotations from off-line resources. At Block 318, a probabilistic model is applied to the crowd sourced annotation to determine the most probable annotation of the object, such as the true classification of the object. If the most probable annotation of the object is above a predetermined ground truth confidence threshold, then the most probable annotation is referred to as a final annotation and is a ground truth label for fine-tuning the previously trained perception model.

At Block 320, an image of the object together with the ground truth label is used to fine-tune the machine learning model for future updates to the perception model used in the perception system 118. Collecting annotations and combining them with offline annotations helps provides a stream of new data for perception system updates.

Figure 4:
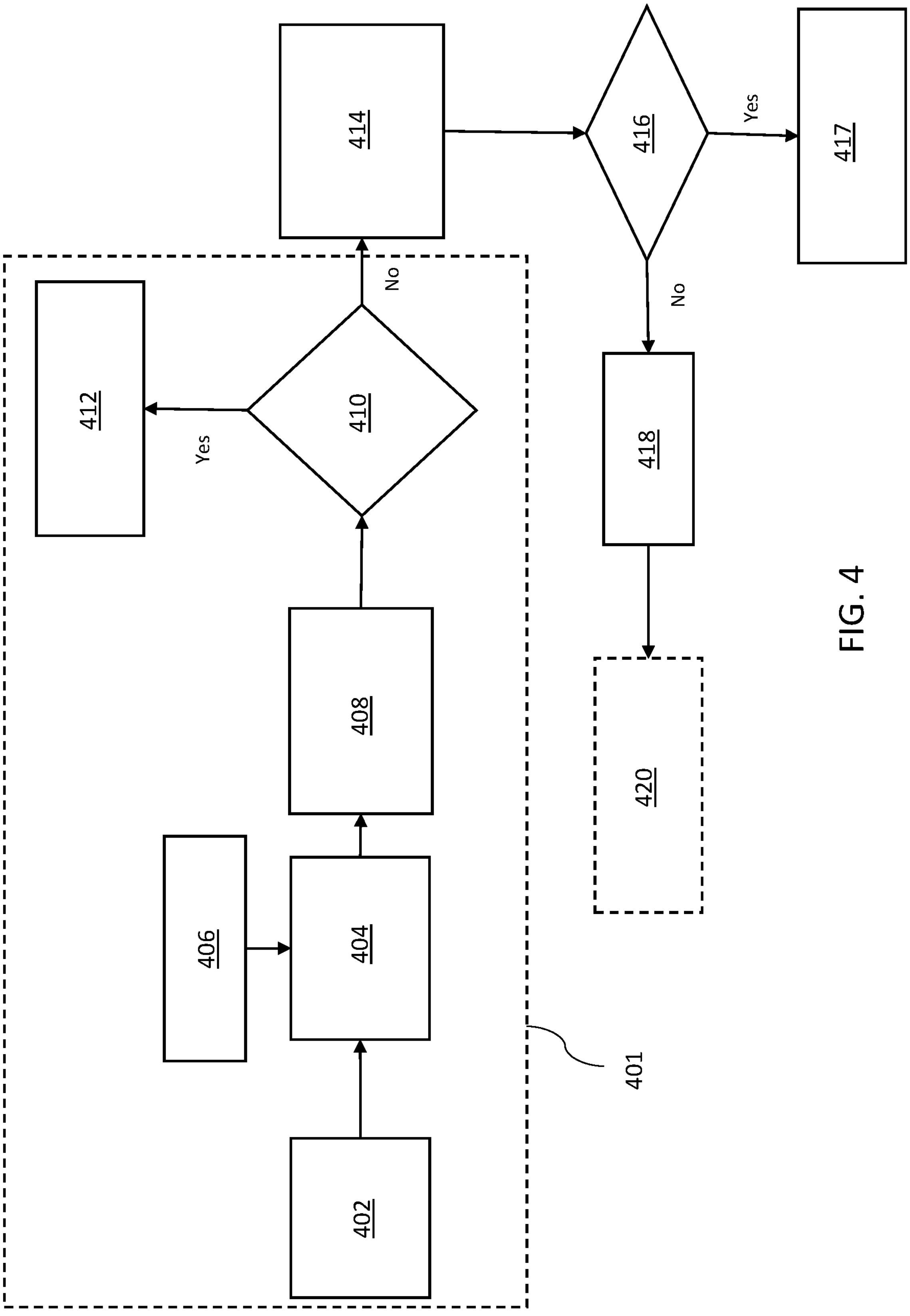
FIGS. 4-6 is a flow diagram of a method of gamified active learning executed by the perception module of FIG. 2, according to an exemplary embodiment.
Figure 5:
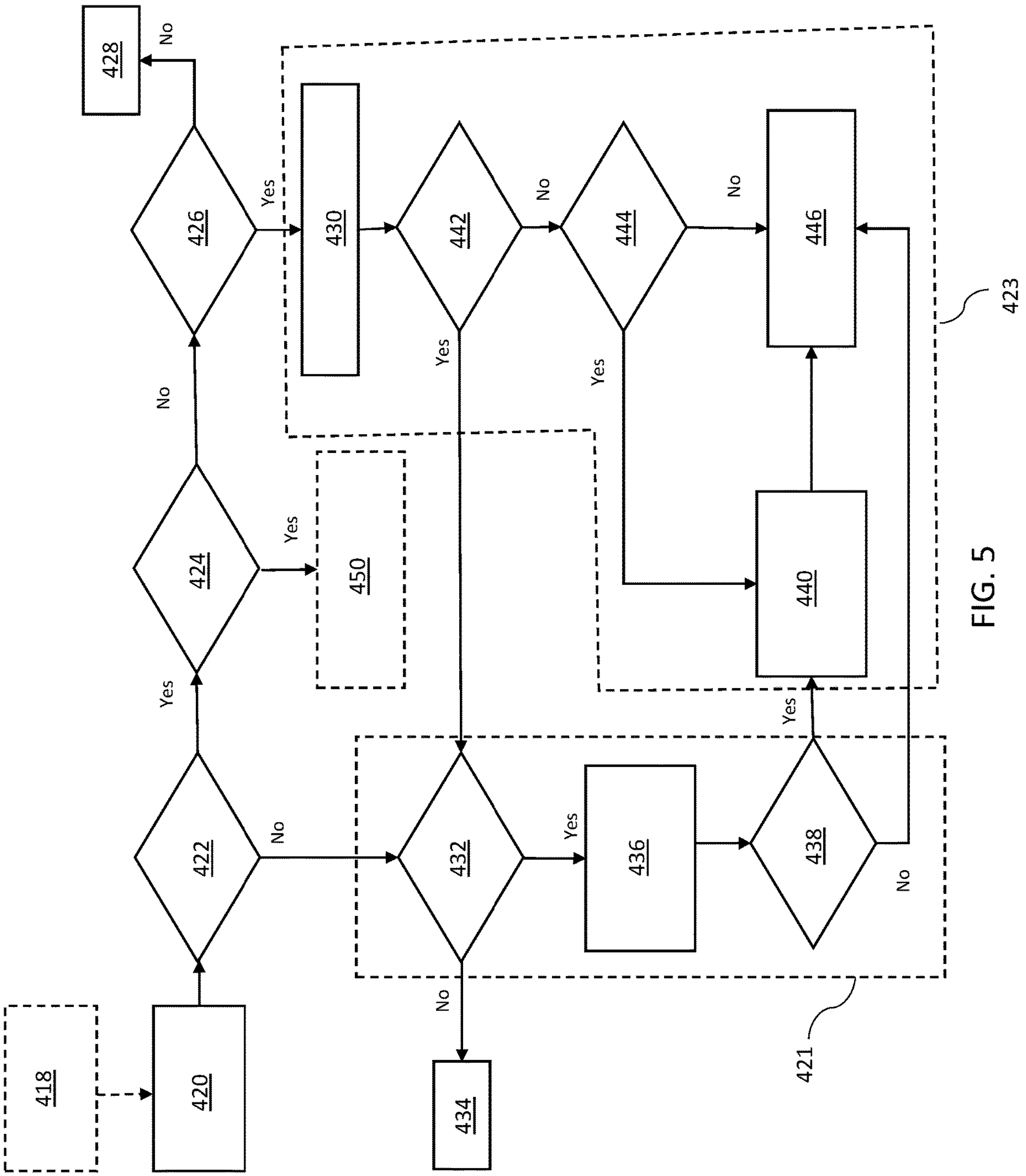
Figure 6:
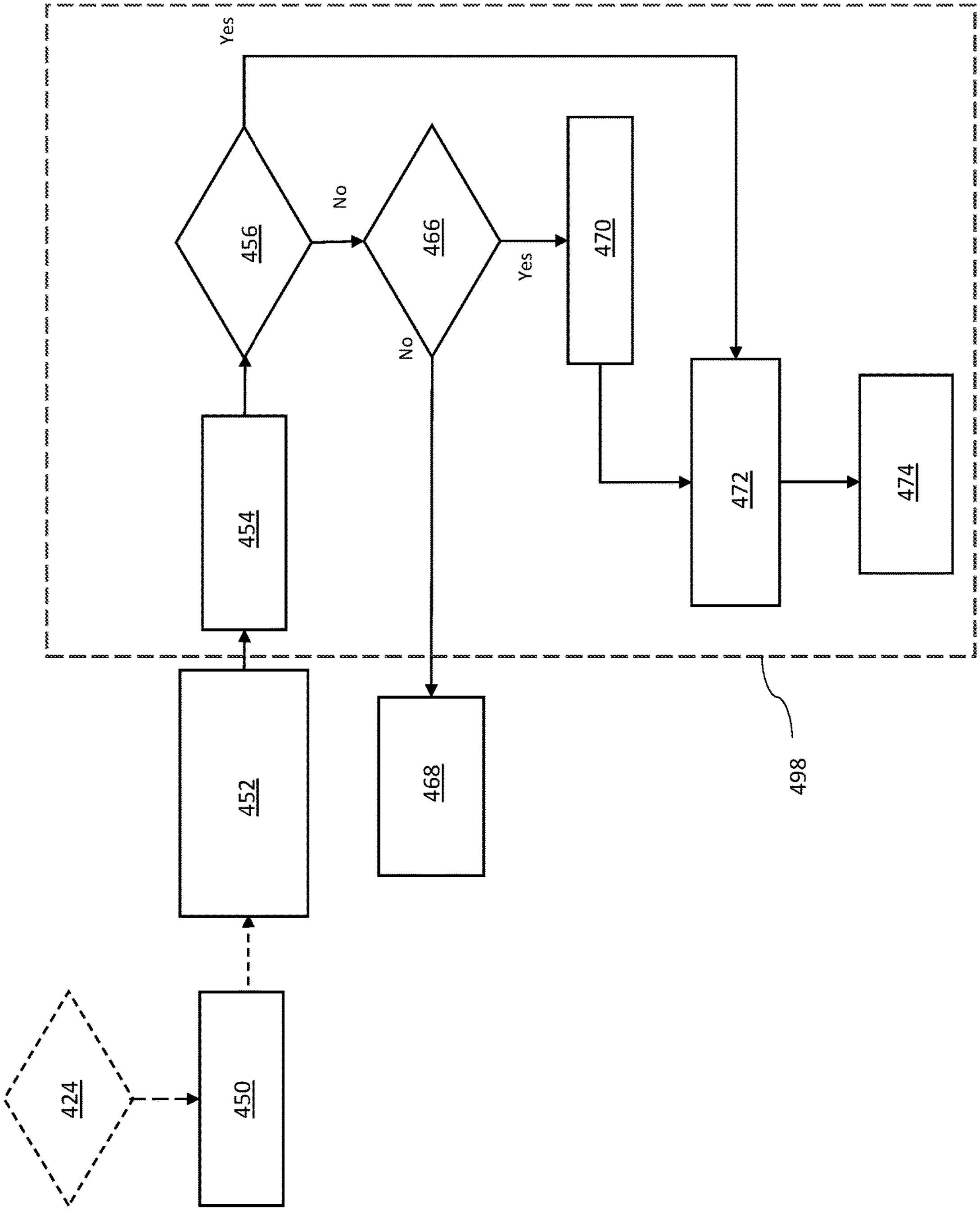

FIGS. 4 through 6 show a flow chart of a method for gamified active learning, also referred to as Method 400. Referring to FIG. 4, the Method 400 beings at Block 402. The dash box 401 surrounds the steps that may be performed by the on-board perception system 118 of the vehicle.

At Block 402, the perception system 118 performs a perception task such as object detection, object classification, instance segmentation, semantic segmentation, scene text recognition and extraction, and the like. The product or result of the perception task is referred to as the task result. In a non-limiting example, the perception system 118 is tasked to receive image data from the cameras, detect an object in the image data, and determine the classification of the object. The perception system 118 completes the task and determines the classification of the detected object to be a traffic sign. Thus, the traffic sign is the result of the completed task and may be referred to as the task result.

At Block 404, possible object classifications, detection, text extraction or the like are determined by using a perception model for the object using predefined object categories from Block 406. The perception model is already developed by training a machine learning model based on images of objects and perception tasks such as object classifications, object detection, text extractions, and the like for the individual images of objects during the training phase. At Block 408, each of the possible task results includes a probability or confidence level that the task result is accurate. The most probable task result is selected.

At Block 410, the probability of accuracy of the task result is compared to a predetermined perception confidence threshold. If the probability of accuracy of the task result is at or above the predetermined perception threshold, then the Method 400 moves to Block 412. At Block 412, the outcome of the task result is sent to the vehicle control module, a vehicle system, and/or other modules for further operations of the vehicle and the Method 400 ends for the current user. The further operations may include autonomously operating the vehicle or warning the driver or operator of an obstruction in the lane of travel. If the probability of the task result is below the predetermined perception confidence threshold, then the Method 400 moves to Block 414. At Block 414, the module 202 communicates with the off-board server and uploads telemetry data including the image being processed to the off-board server. In continuation of the non-limiting example, the task result may be that of the determined classification of the object.

At Block 416, based on telemetry data locating the object, the off-board server determines whether the object has been previously annotated by other vehicles. If previously annotated then verify that the annotation, such as the classification of the object, is accurate. If the object has been previously annotated and has been verified that the task result is accurate (i.e. having a probability above the ground truth confidence threshold), then the Method 400 moves to Block 417 and the game ends for the current user. Referring back to Block 416, if the server determined the object has not been previously annotated or if the annotation has not been verified as accurate, then the Method 400 moves to Block 418. This may happen if the unidentified object is not used in the game yet, or the annotation is not completed for this object by asking binary questions to multiple occupants of multiple vehicles.

In Block 418, the telemetry data locating the object is cross-referenced with map data to determine possible choices of annotations for the object. In a non-limiting example, the perception task is to read a traffic sign that shows the name of a street, but the name on the street sign is obscured or otherwise illegible. The telemetry data is cross-referenced with the map data to determine the names of the streets at or near the location of the street sign. The determined possible names for the street name sign may be used as possible annotation choices later in the Method 400. The Method 400 moves to Block 420.

Referring to FIG. 5, at Block 420, the gaming portion of the Method 400 begins. The dashed boundary box 421 surrounds steps for presenting a freeform answer question to the user and the dashed boundary box 423 surrounds steps for presenting a multiple choice question to the user.

At Block 422, the off-board server determines if existing confirmed choices of annotations are available for answer selection. Confirmed choices of annotation means annotations having a probability above a predetermined first annotation confidence threshold or enough answers are collected by repeating steps in dashed boundary box 421 and/or dashed boundary box 423 for the same object, but on a plurality of vehicles. If the confirmed choices of annotations are not available, then the Method 400 moves to Block 432.

At Block 432, an inquiry is made to determine if the user is participating in the game and if the user is credible enough to provide a freeform answer to a question. The credibility of the user may be based on the accuracy of previous annotations provided by the user. If the user is not participating in the game or determined to be non-credible, then the Method 400 moves to Block 434 and the Method 400 ends for the current user.

Referring back to Block 432, if the user is determined to be credible, then the Method 400 moves to Block 436. At Block 436, an image of the object is shown to the user on a HMI display and the user is asked to annotate the object with a freeform answer. A freeform answer, also referred to as a freeform annotation, means the user is free to provide an annotation of the object without having to choose from a list of predetermined annotation choices. The user is rewarded once the freeform annotation is submitted to the server.

Moving to Block 438, the freeform response from the user is aggregated with a plurality of freeform annotations from other users. The plurality of freeform annotations for the same object may be made and submitted at different time periods. The aggregated freeform annotations are analyzed to determine the possible ground truth labels, such as possible classifications, for the object. The probability of accuracy of the freeform answer submitted by the user may be based on a predetermined number of times (X) a common annotation of the object is noted by a predetermined number of users (Y). When the probability of accuracy of the freeform answer exceeds the predetermined first annotation confidence threshold, then at Block 440, the freeform answer is selected and entered as possible annotation choices in multiple choice questions or binary choice questions.

Referring back to Block 438, if a freeform answer of the user is still not noted a predetermined number of times (X) by a predetermined number of users (Y), then the Method 400 moves to Block 446 where the Method 400 ends for the current user.

Referring back to Block 422, if confirmed choices of annotations are available, then the Method 400 moves to Block 424. At Block 424, if the confidence level of the confirmed choices are below a predetermined second annotation confidence threshold and is greater than the first annotation confidence level, then the Method 400 moves to Block 426. At Block 426, an inquiry is made to determine if the user is participating in the game and is credible to answer a multiple choice question. If the user is not participating or non-credible, then the Method 400 moves to Block 428 and the Method 400 ends for the current user. Referring back to Block 426, if the user and/or participating vehicle is credible, then the Method 400 moves to Block 430.

At Block 430, an image of the object is shown to the user on a HMI display and the user is presented with a multiple choice question regarding the possible classifications of the object. The user is rewarded by selecting a choice of answer for the multiple choice question. Moving to Block 442, if the user rejected all of the multiple choices, then the Method 400 moves to Block 432 and continues therefrom.

Referring back to Block 442, if the user selects one of the multiple choice answers, the Method 400 moves to Block 444. At Block 444, a selection of a choice of answer is considered a vote for the annotation presented in the choice of answer. The number of votes are tallied for each selected choice. If there is a predetermined number of votes (Z) for the answer selected by the user collected from a predetermined number of users (Y), then the Method 400 moves to Block 440.

At Block 440, the particular answer selected by the user having at least predetermined number of votes (Z) for a particular annotation by a predetermined number of users (Y) is selected and may be used as possible annotation choices in binary choice questions in FIG. 6. This choice is now flagged as a confident choice.

Referring back to Block 444, if there is not a predetermined number of votes (Z) for the answer selected by the user collected from a predetermined number of users (Y), then the Method 400 moves to Block 446 and the method ends for the current user.

Referring back to Block 424, if the confidence level of the confirmed choices are at or above the predetermined second annotation confidence threshold, which is greater than the first annotation confidence level, then the Method 400 moves to Block 450 for presenting binary questions.

Referring to FIG. 6, the dashed boundary box 498 contains steps that may be executed by a remote server or cloud server. Proceeding to Block 452, the user is presented with an image of the object together with a binary choice question. A non-limiting example of a non-binary choice question would be a potential classification of the object and the possible binary choice answer would be a "yes" or "no" response in indicating whether or not the user agrees potential classification of the object. In a non-limiting example, the question may be confirming whether a road sign is a stop sign, requiring a "yes" answer to confirm the sign is a stop sign and a "no" answer to confirm the sign is not a stop sign. If the user choses to answer the binary choice question, then the user is rewarded. The Method 400 moves to Block 454.

Figure 7:
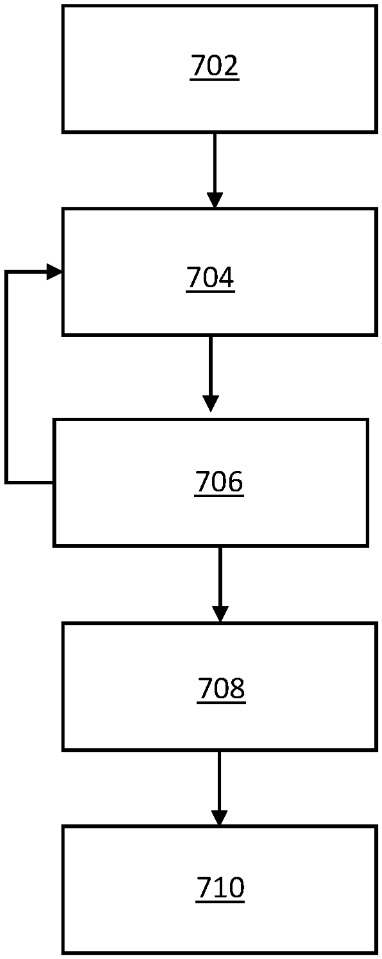
FIG. 7 is a flow diagram of a workflow of a back-office update of results for the method of gamified active learning, according to an exemplary embodiment.

At Block 454, the annotation answers for the binary choice questions for the same image are aggregated. A probabilistic algorithm is applied to aggregate the binary choice answers to determine the most probable characteristic of the object. The probabilistic algorithm is explained in FIG. 7. Referring to FIG. 7, at Block 702, the latest category probability distribution, also referred to as a prior probability distribution, having several possible choice of annotations for a perception task result is provided. At Block 704, the users' answers to the binary choice question is received. Each response from a user confirming a particular task result, such as a user confirming "Yes" that the traffic sign is a stop sign, represents a "vote" in favor of the annotation answer versus one or more of the alternative annotation answers of the object. See below for a non-limit example on determining the true text for a traffic sign.

At Block 706, the prior probability distribution is updated based on the collected answer from the users. The result is an updated posterior probability distribution that will be saved back to the server. At Block 708, the confidence level of the most probable annotation is determined. At Block 710, the possible annotation with highest probability together with the corresponding confidence level computed in 708 is aggregated in Block 454 of FIG. 6.

Referring to different steps in FIG. 7, an exemplary approach to update the probability distributions are summarized below. This is only a one possible solution and alternative methods might be used. The prior category probability distribution is a model category probability distribution such as a Dirichlet distribution parameterized by $$\{\alpha_i\}_{i=1}^{N} \text{ for } N$$

different categories.

$$q_i = \frac{\alpha_i}{\sum \alpha_i}$$

can be interpreted as probability of category i

Initial values for parameters could be equal to express absolute uncertainty

Treat each user response as a realization of a multinomial distribution given by $$\{r_i\}_{i=1}^{N}$$

However, we allow for "fractional" realizations according to prior mapping

E.g., $r_1=1$ and $r_n=0$ $\forall(n\neq 1)$ if user confirms category 1 OR $r_1=0$ and $$r_n = \frac{1}{N-1}$$

$\forall(n\neq 1)$ otherwise

Bayesian update of parameters according to $\alpha_i \leftarrow \alpha_i \leftarrow r_i$ Posterior $\alpha_i$ values can be used to determine confidences and therefore when to make a decision about true category (true task result)

Values of mapped user responses $r_i$ can be weighted by replacing with $r_i \leftarrow g_k r_i$ For reliability score $g_k \leq 1$ for given user k Users whose responses contradict the average response can be set to a small value by scaling down $g_k$, e.g., by multiplying 0.9

Example

Possible labels: STOP, YIELD and PARKING

User shown image and asked, "Is this a STOP sign?" [Y/N]

"Y" confirms a "STOP" sign

"N" implies it may be "yield" or "parking" signs.

If user response is "Y" then r=(1, 0, 0);

One vote for STOP, zero votes for others

If user response "N" then r=(0, 0.5, 0.5)

No vote for STOP, 0.5 votes for others

Assume current (or initial) α=(10, 10, 10).

If user response is "Y" then

α←(11, 10, 10)

If user response "N" then

α←(10, 10.5, 10.5)

Referring back to FIG. 6, at Block 456, if the probability for an annotation exceeds a predetermined ground truth confidence threshold, then the Method 400 moves to Block 472. At Block 472, the image of the object together with the annotation, is sent to the cloud based server 205A or back-office server 205B for fine-tuning the machine learning model.

Referring back to Block 456, if the probability does not exceed the predetermined ground truth confidence threshold, then the Method 400 moves to Block 466. At Block 466, if the number of user responding exceeds a predetermined number, then Method 400 moves to Block 470. At Block 470, the data is sent to human annotators offline. At Block 472, the annotated data is uploaded to the cloud server for further training of the machine learning model. At Block 474, the perception model is fine-tuned using the new annotated data and is updated. A notification might be sent to all users of the perception system and the perception system software (perception model) can be updated remotely when the vehicle is not in use.

Referring back to Block 466, if the number of users responding does not exceed a predetermined number, then Method 400 moves to Block 468 where the Method 400 ends for the current user.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of gamified active learning for a perception system of a vehicle, comprising:

applying a perception model to execute a perception task on an object to obtain a task result, wherein the perception model is based on a machine learning model;

determining a perception confidence level for the task result;

determining the perception confidence level is below a predetermined perception confidence level;

showing an image of the object to an on-scene user;

requesting the on-scene user to annotate the object;

providing an annotation of the object by the on-scene user, wherein the annotation is based on a visual observation of the object by the on-scene user;

rewarding the on-scene user in response to the on-scene user providing the annotation of the object; and training the machine learning model with the image of the object and the annotation of the object by the on-scene user to update the perception model;

wherein requesting the on-scene user to annotate the object includes:

requesting the on-scene user to answer a predetermined question directed to the object, wherein the predetermined question is selected from a group consisting of a freeform answer question, a multiple choice question, and a binary choice answer question.

2. The method of claim 1, further comprising:

determining a choice of annotation for the object does not exist on a server before requesting the on-scene user to annotate the object; and selecting the freeform answer question in response to the choice of annotation does not exist on the server.

3. The method of claim 1, further comprising:

determining a choice of annotation for the object exists on a server before requesting the on-scene user to annotate the object;

determining an annotation confidence level of the choice of annotation for the object is less than a predetermined annotation confidence threshold; and selecting the multiple choice question in response to the choice of annotation for the object is less than the predetermined annotation confidence threshold.

4. The method of claim 1, further comprising:

determining a choice of annotation for the object exists on a server before requesting the on-scene user to annotate the object;

determining an annotation confidence level of the choice of annotation for the object is equal to or greater a predetermined annotation confidence threshold; and selecting the binary choice question in response to the annotation confidence level of the choice of annotation for the object is equal to or greater than the predetermined annotation confidence threshold and the choice of annotation for the object exists on the server before requesting the on-scene user to annotate the object.

5. The method of claim 4, further comprises:

providing annotations of a same object by a plurality of on-scene users;

aggregating the annotations of the same object;

applying a probabilistic model on the aggregated annotations to determine a ground truth annotation of the same object; and training the machine learning model with an image of the same object and the ground truth annotation of the same object.

6. The method of claim 5, wherein the annotations provided by the plurality of on-scene users are based on the binary choice question.

7. The method of claim 5, wherein the probabilistic model is a Dirichlet distribution.

8. The method of claim 5, wherein the same object is observed at different time periods and at different viewing perspectives.

9. The method of claim 1, further comprising determining the on-scene user is credible before requesting the on-scene user to answer the predetermined question.

10. A gamified active learning system for a vehicle, comprising:

a human-machine-interface (HMI) configured to display an image to an occupant of the vehicle;

at least one external viewing camera; and a perception module having a perception model configured to:

receive perception data from the at least one external viewing camera, analyze the received perception data to detect an object, execute a perception task to obtain a task result for the object, determine a perception confidence level of the task result, determine the perception confidence level of the task result is below a predetermined perception confidence threshold, send a signal to the HMI to show an image of the object to an on-scene user, request the on-scene user to annotate the object based on a visual inspection of the object by the on-scene user, wherein the request to the on-scene user to annotate includes answering a predetermined question selected from a group consisting of a freeform answer question directed to the object, a multiple choice question directed to the object, and a binary choice answer question directed to the object;

receive an annotation from the on-scene user, and reward the on-scene user in response to receiving the annotation from the on-scene user;

wherein the perception module having the perception model is further configured to determine one of: (i) a choice of annotation for the object exists on a server, and (ii) the choice of annotation for the object does not exist on a server;

determine one of: (i) an annotation confidence level of the choice of annotation for the object is less than a predetermined annotation confidence threshold, and (ii) the annotation confidence level of the choice of annotation for the object is equal to or greater than the predetermined annotation confidence threshold; and selecting one of:

(i) the freeform answer question in response to the choice of annotation for the object does not exist on the server;

(ii) the multiple choice question in response to the choice of annotation for the object exists on the server and the annotation confidence level of the choice of annotation is less than the predetermined annotation confidence threshold; and (iii) the binary question in response to the choice of annotation for the object exists on the server and the annotation confidence level of the choice of annotation is equal to or greater than the predetermined annotation confidence threshold.

11. The gamified active learning system for a vehicle of claim 10, further comprising:

a remote server configured to:

aggregate a plurality of annotations from a plurality of users;

apply a probabilistic model on the aggregated annotations to determine a ground truth annotation of the same object; and input the ground truth annotation and an image of the object to a machine learning model to update the perception model.

12. The gamified active learning system for a vehicle of claim 11, wherein the perception task is to determine a classification of the object and the task result is a predicted classification of the object.

13. The gamified active learning system for a vehicle of claim 11, wherein the object is a street sign, the perception task is an extraction of text from the street sign, and the task result is a prediction of a name on the street sign based on the extracted text.

14. The gamified active learning system for a vehicle of claim 10, wherein the HMI is a personal electronic device off-board the vehicle.

15. A perception module of a vehicle comprising:

a processor; and a non-transitory computer readable storage device comprising a perception model stored thereon for gamified active learning, that upon execution of the perception model by the processor, cause the processor to:

execute a perception task to obtain a task result for a detected object;

determine a perception confidence level of the task result;

determine the perception confidence level of the task result is below a predetermined perception confidence threshold;

send a signal to a visual display to show an image of the object to an on-scene user in response to the perception confidence level of the task result is below the predetermined perception confidence threshold;

request the on-scene user to answer a predetermined question regarding the object;

receive an answer from the on-scene user based on a visual observation of the object by the on-scene user;

determine one of: (i) a choice of annotation for the object exists on a server, and (ii) the choice of annotation for the object does not exist on a server; and determine one of: (i) an annotation confidence level of the choice of annotation for the object is less than a predetermined annotation confidence threshold, and (ii) the annotation confidence level of the choice of annotation for the object is equal to or greater than the predetermined annotation confidence threshold; and wherein the predetermined question regarding the object is selected from a group consisting of:

(i) a freeform answer question in response to the choice of annotation for the object does not exist on the server;

(ii) a multiple choice question in response to the choice of annotation for the object exists on the server and the annotation confidence level of the choice of annotation is less than the predetermined annotation confidence threshold; and (iii) a binary question in response to the choice of annotation for the object exists on the server and the annotation confidence level of the choice of annotation is equal to or greater than the predetermined annotation confidence threshold.

16. The perception module of claim 15, wherein the upon execution of the perception model by the processor, further cause the processor to:

annotate the image based on the answer from the on-scene user;

upload the annotated image to a remote server to train a machine learning model to update the perception model.

17. The perception module of claim 15, wherein the upon execution of the perception model by the processor, further cause the processor to:

determine that the on-scene user is credible before requesting the on-scene user to answer a predetermined question regarding the object.

18. The perception module of claim 17, wherein the perception module is part of a perception system on a vehicle.

* * * * *